US010676197B2

(12) United States Patent
Haynes et al.

(10) Patent No.: US 10,676,197 B2
(45) Date of Patent: Jun. 9, 2020

(54) ASPIRATOR

(71) Applicant: Goodrich Corporation, Charlotte, NC (US)

(72) Inventors: Timothy C Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 713 days.

(21) Appl. No.: 15/398,309

(22) Filed: Jan. 4, 2017

(65) Prior Publication Data

US 2018/0186461 A1    Jul. 5, 2018

(51) Int. Cl.
| | | |
|---|---|---|
| B64D 25/14 | (2006.01) | |
| F04F 5/18 | (2006.01) | |
| F04F 5/46 | (2006.01) | |
| B64D 25/18 | (2006.01) | |
| F04F 5/16 | (2006.01) | |

(52) U.S. Cl.
CPC ............. *B64D 25/14* (2013.01); *B64D 25/18* (2013.01); *F04F 5/16* (2013.01); *F04F 5/18* (2013.01); *F04F 5/46* (2013.01); *F04F 5/463* (2013.01)

(58) Field of Classification Search
CPC ........ F04F 5/00; F04F 5/14; F04F 5/16; F04F 5/44; F04F 5/464
USPC ........................................................ 244/905
See application file for complete search history.

(56) References Cited

U.S. PATENT DOCUMENTS

| | | | | |
|---|---|---|---|---|
| RE27,860 E | * | 1/1974 | Day ....................... | B64D 25/14 417/184 |
| 4,368,009 A | * | 1/1983 | Heimovics, Jr. ...... | B61B 12/005 417/179 |
| 4,566,862 A | | 1/1986 | Halavais | |
| 5,894,114 A | | 4/1999 | Eigenmann | |
| 6,591,873 B1 | | 7/2003 | McNeil | |
| 2010/0172750 A1 | * | 7/2010 | Mugnier ............... | F04D 17/025 415/199.4 |
| 2016/0097402 A1 | * | 4/2016 | Yamagata ........... | F04D 25/0613 417/423.7 |
| 2016/0102682 A1 | | 4/2016 | Gass | |

FOREIGN PATENT DOCUMENTS

| | | |
|---|---|---|
| DE | 102005020484 | 11/2006 |
| WO | 2010083151 | 7/2010 |

OTHER PUBLICATIONS

European Patent Office, European Search Report dated May 7, 2018 in Application No. 18150236.0-1010.

* cited by examiner

*Primary Examiner* — Patrick Hamo
(74) *Attorney, Agent, or Firm* — Snell & Wilmer, L.L.P.

(57) ABSTRACT

An aspirator may comprise an aspirator body defining an air channel and an inlet. A flow straightener may be disposed at the inlet. The flow straightener may be configured to produce a laminar flow through the air channel. An aspirator barrel may be coupled to the aspirator body and may define an outlet. A static airfoil assembly may be disposed at the outlet. The static airfoil assembly may be configured to produce a vortex flow exiting the aspirator barrel.

17 Claims, 6 Drawing Sheets

ASPIRATOR

FIELD

The present disclosure is directed to evacuation systems for use in aircraft and, more particularly, to aspirators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the charged gas cylinder, combines gas from the atmosphere and the fluid to provide gas for inflating the emergency evacuation devices. Aspirators are typically stored in a limited packing space with the evacuation slide within a small space in the aircraft. The high packing density may lead to various issues including cracking of aspirators, which may be fragile.

SUMMARY

An aspirator for an inflatable device is described herein, in accordance with various embodiments. An aspirator may comprise an aspirator body defining an air channel and an inlet. A flow straightener may be disposed at the inlet. The flow straightener may be configured to produce a laminar flow through the air channel. An aspirator barrel may be coupled to the aspirator body and may define an outlet. A static airfoil assembly may be disposed at the outlet. The static airfoil assembly may be configured to produce a vortex flow exiting the aspirator barrel.

In various embodiments, the aspirator may comprise a longitudinal axis. The flow straightener may direct an airflow into the aspirator body in a direction parallel to the longitudinal axis of the aspirator. The flow straightener may define a plurality of apertures configured to direct the airflow. The flow straightener may include a honeycomb structure configured to reduce turbulence of airflow entering the air channel. The vortex flow exiting the aspirator barrel may be directed in a spiral motion centered around the longitudinal axis of the aspirator. The static airfoil assembly may comprise a plurality of static airfoils arranged in a spoke configuration. The plurality of static airfoils may have an arcuate cross-sectional shape and may be stationary with respect to the aspirator barrel.

An evacuation system for use with an aircraft is also provided. The evacuation system may comprise an inflatable evacuation device configured to be inflated by a compressed fluid source. An aspirator may be coupled to the compressed fluid source and to the inflatable evacuation device. The aspirator may comprise an aspirator body defining an air channel and an inlet. A flow straightener may be disposed at the inlet. The flow straightener may be configured to produce a laminar flow through the air channel.

In various embodiments, the aspirator may comprise a longitudinal axis. The flow straightener may direct an airflow into the aspirator body in a direction parallel to the longitudinal axis of the aspirator. The flow straightener may define a plurality of apertures configured to direct the airflow. The flow straightener may include a honeycomb structure configured to reduce turbulence of airflow entering the air channel. An aspirator barrel may be coupled to the aspirator body and defining an outlet. A static airfoil assembly disposed at the outlet. The static airfoil assembly may be configured to produce a vortex flow exiting the aspirator barrel. The static airfoil assembly may comprise a plurality of static airfoils arranged in a spoke configuration. The vortex flow exiting the aspirator barrel may be directed in a spiral motion centered around the longitudinal axis of the aspirator. The aspirator may be configured to pack with the inflatable evacuation device within the aircraft.

An aspirator method is also provided. The method may comprise the steps of disposing a flow straightener at an inlet of an aspirator, and aspirating air through the flow straightener into an air channel defined by the aspirator. The flow straightener may produce a laminar flow through the air channel. The method may comprise the step of disposing a static airfoil assembly at an outlet of the aspirator. The static airfoil assembly may produce a vortex flow exiting the aspirator.

In various embodiments, the aspirator may comprise a longitudinal axis. The flow straightener may direct an airflow into the air channel in a direction parallel to the longitudinal axis of the aspirator. The flow straightener may include a honeycomb structure configured to reduce turbulence of airflow entering the air channel. The vortex flow exiting the outlet is may be directed in a spiral motion centered around the longitudinal axis of the aspirator. The method may further comprise the step of directing the vortex flow from the aspirator into an inflatable evacuation device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to aspirators for inflatable devices. In various embodiments, the aspirator may include flow control features to direct the airflow through an air channel of the aspirator and to direct the airflow prior to exiting the aspirator barrel. The flow control features allow the aspirator to be made having a shorter length while still achieving efficient inflation. A smaller size aspirator allows the aspirator to occupy less storage space within the packboard of the aircraft.

Figure 1:
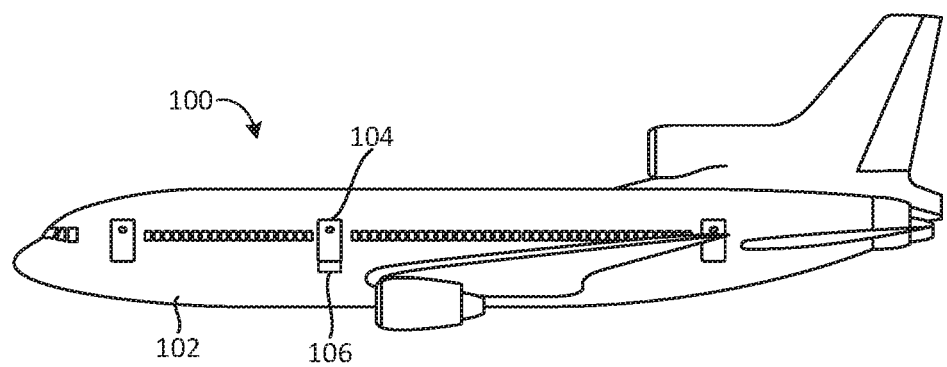
FIG. 1 illustrates a perspective view of an aircraft having an evacuation system, in accordance with various embodiments.

Referring to FIG. 1, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 2:
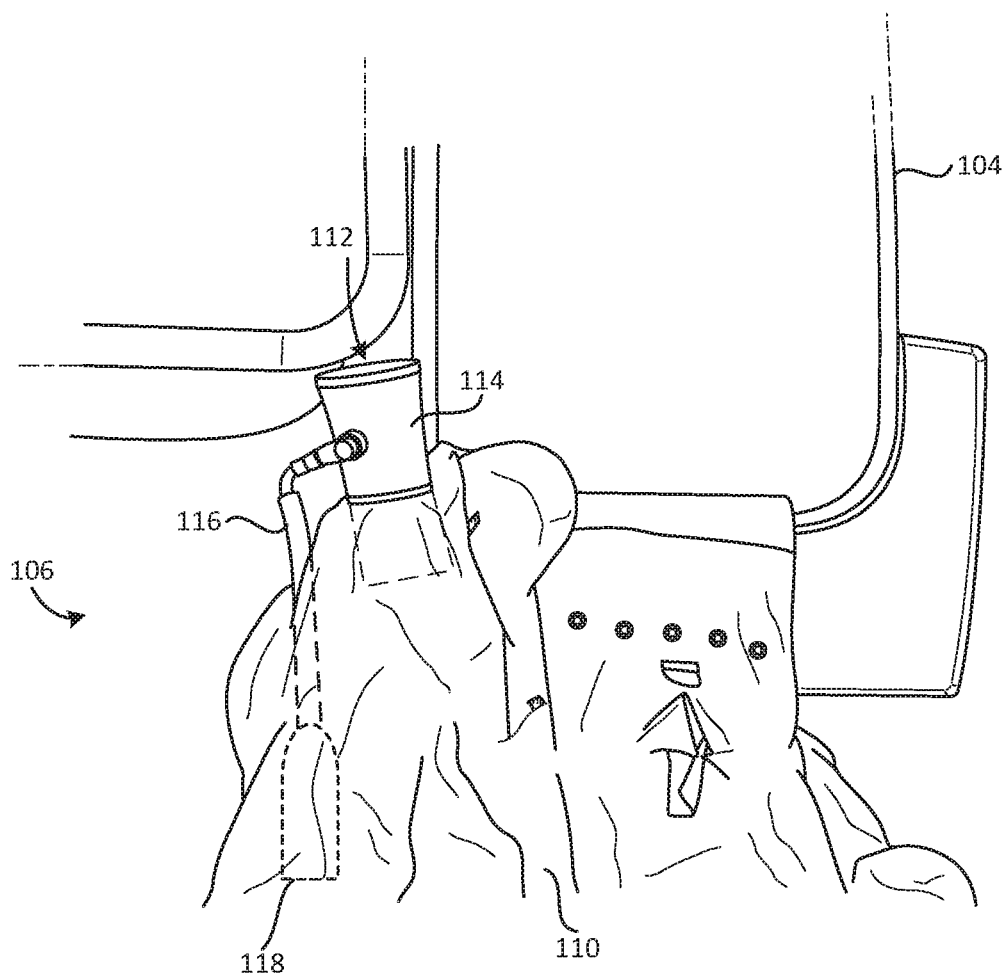
FIG. 2 illustrates an evacuation system, in accordance with various embodiments.

Referring to FIGS. 1 and 2, additional details of evacuation system 106 are illustrated, in accordance with various embodiments. In particular, evacuation system 106 includes an inflatable evacuation device 110. Inflatable evacuation device 110 may be a slide, a slide raft, a life raft, a floatation device or other evacuation device, which may be inflatable. Evacuation system 106 further includes a source of forced gas 112. The source of forced gas 112 may cause a gas to enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, the source of forced gas 112 may include an aspirator 114 coupled to the inflatable evacuation device 110, piping 116 coupled to the aspirator 114, and a compressed fluid source 118 coupled to the piping 116. During normal flight conditions, inflatable evacuation device 110 may be deflated and stored within a compartment of aircraft 100. In various embodiments, inflatable evacuation device 110 and aspirator 114 may be stored in a single package within the aircraft compartment. In response to deployment of evacuation system 106, fluid may flow into aspirator 114 via piping 116 at a relatively high velocity. This fluid flow may cause aspirator 114 to draw gas from the environment. The fluid flow (such as in a gaseous state) and the environmental gas may be directed into the inflatable evacuation device 110. In response to receiving the fluid flow and the environmental gas, inflatable evacuation device 110 may begin to inflate.

Figure 3:
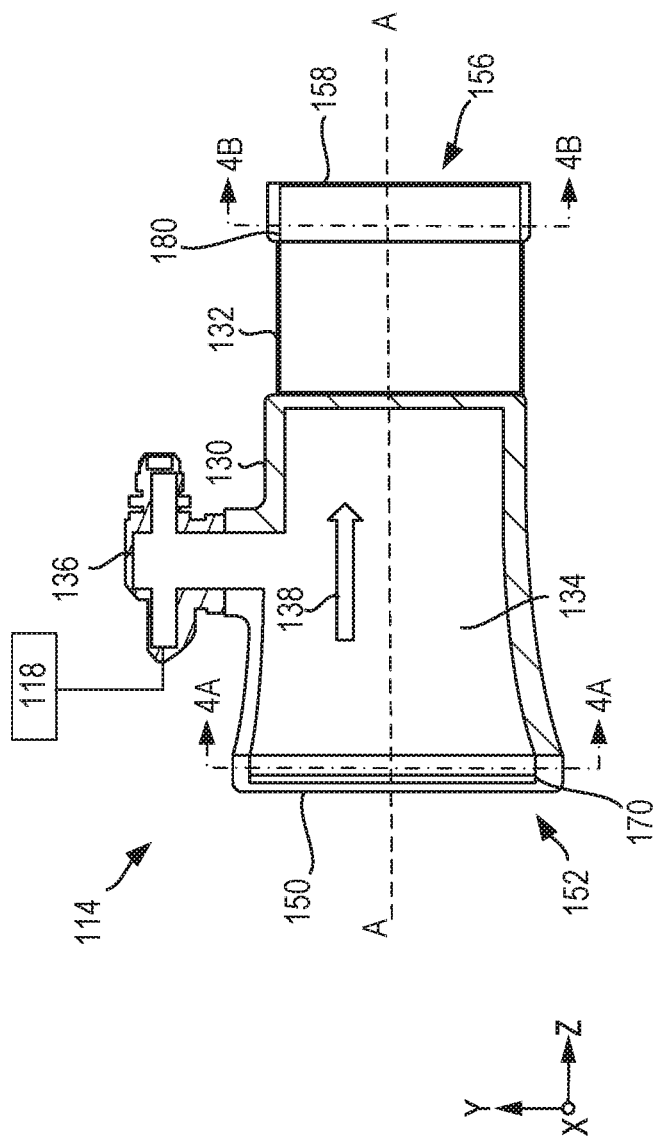
FIG. 3 illustrates a cross-sectional view of an aspirator for an inflatable evacuation device, in accordance with various embodiments.

With reference to FIG. 3, additional details of an aspirator 114 are shown, in accordance with various embodiments. Aspirator 114 may include an aspirator body 130 coupled to an aspirator barrel 132. Aspirator body 130 may define an air channel 134, which may be a chamber of aspirator 114 having an airflow path 138. Aspirator body 130 and/or aspirator barrel 132 may have a cylindrical geometry, i.e., may have a circular cross section or other cross sectional geometry, such as square, oval, or other shape. Aspirator 114 may have a longitudinal axis A-A, and airflow path 138 may generally flow axially through aspirator 114 along longitudinal axis A-A.

Aspirator 114 may include a gas valve 136 in fluid communication with air channel 134. Gas valve 136 may direct a fluid from a compressed fluid source 118 (shown schematically), such as a charged cylinder, into air channel 134. In response to high-pressure gas moving from the compressed fluid source 118 to air channel 134 via gas valve 136, gas from the environment surrounding the aspirator 114 is compelled into air channel 134 from outside the aspirator 114 due to the Venturi effect. Stated differently, aspirator 114 facilitates intake of gas from the environment, which enters air channel 134 through an inlet 150 of the aspirator 114. The airflow path 138 through air channel 134 is illustrated as flowing in the positive z-direction on the provided xyz axes.

As used herein, "distal" refers to the direction toward the positive z-direction on the provided xyz axes relative to aspirator 114. As used herein, "proximal" refers to a direction toward the negative z-direction on the provided xyz axes relative to aspirator 114. The term "upstream" is used to refer to directions and positions located closer to a gas source than directions and positions referenced as "downstream."

Aspirator 114 may include a proximal end 152 having an inlet 150 defined by aspirator body 130. Aspirator 114 may include a distal end 156 having an outlet 158 defined by aspirator barrel 132. Distal end 154 of aspirator barrel 132 may extend into inflatable evacuation device 110 (FIG. 2). A gas may flow into aspirator body 130 through inlet 150. Gas may flow downstream through aspirator 114, shown by airflow path 138, in generally an axial direction relative to the longitudinal axis A-A' of aspirator 114. Airflow 134 may flow through aspirator body 130 and aspirator barrel 132, exit aspirator barrel 132 through outlet 158, and flow into inflatable evacuation device 110 (FIG. 2).

In various embodiments, aspirator 114 may include a flow straightener 170 disposed at the inlet 150. Flow straightener 170 may be coupled to aspirator body 130 at inlet 150 and configured to condition the airflow path 138 prior to flowing into air channel 134. Flow straightener 170 may operate as a guide structure configured to receive and straighten the fluid flow of airflow path 138 by directing the airflow in a direction parallel to a longitudinal axis A-A of aspirator 114.

In various embodiments, aspirator 114 may include a static airfoil assembly 180 disposed at outlet 158. Static airfoil assembly 180 may extend along a length L of aspirator barrel 132. Static airfoil assembly 180 may be configured to receive air flowing through air channel 134 into aspirator barrel 132. Static airfoil assembly 180 may be coupled to aspirator barrel 132 and configured to condition the airflow path 138 prior to exiting aspirator barrel 132. As will be discussed below, static airfoil assembly 180 may operate as a guide structure configured to impart a rotating flow direction into airflow path 138.

Figure 4B:
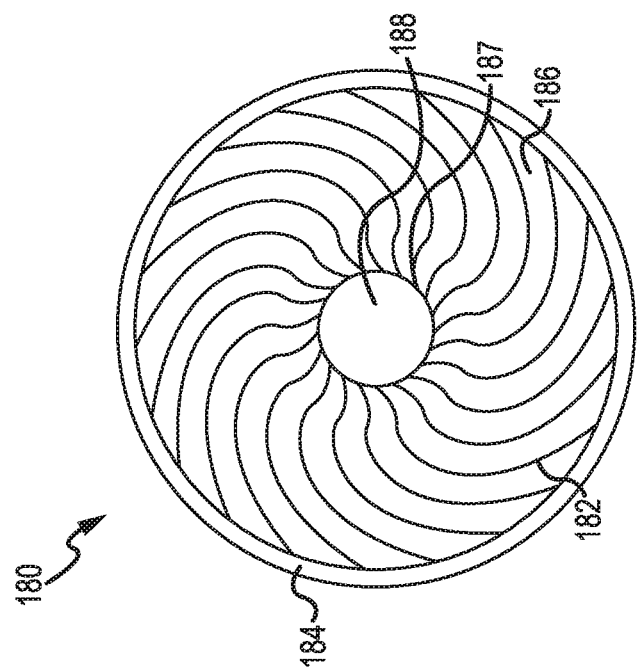
FIG. 4B illustrates a partial view of an aspirator barrel for an aspirator, in accordance with various embodiments.
Figure 4A:
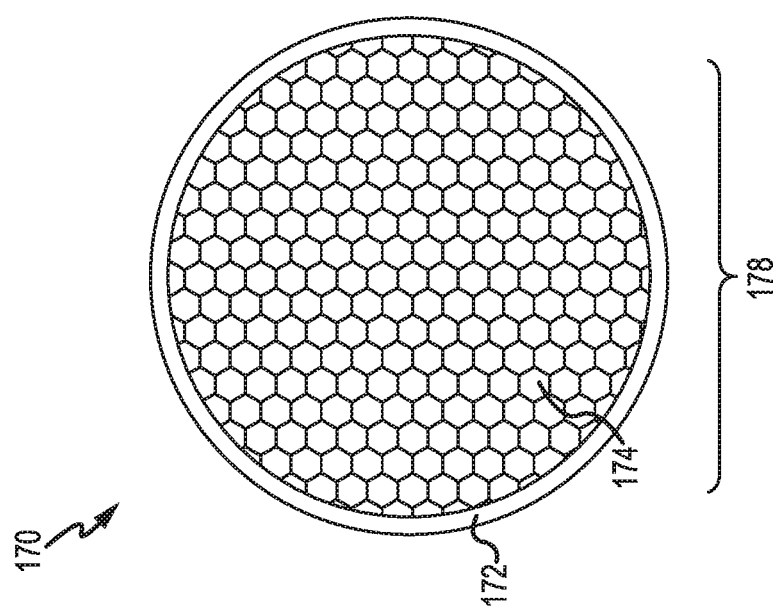
FIG. 4A illustrates a partial view of an aspirator barrel for an aspirator, in accordance with various embodiments.

With reference to FIG. 4A, a cross-sectional view of a flow straightener 170 an inlet 150 of aspirator body 130 taken along line 4A-4A of FIG. 3 is shown, in accordance with various embodiments. Air entering aspirator 114 through inlet 150 may be oriented and/or conditioned by a flow straightener 170. In this regard, flow straightener 170 may be configured to straighten and/or remove turbulence from the airflow path 138 which enters air channel 134 and is conducted to aspirator barrel 132 (FIG. 3).

Flow straightener 170 may comprise a body 172 defining a plurality of apertures 174. In various embodiments, flow straightener 170 may be a mesh, a grate, a perforated sheet, or the like. The apertures 174 may have various sizes (in the xy plane) and various depths (along the z-axis). For example, the apertures 174 may be hollow cells, such as cylinders defined by the body 172 of flow straightener 170, and each having an inlet and an outlet. Each of apertures 174 may form an individual flow channel. Apertures 174 may be configured to reduce turbulence of air flowing through apertures 174. For example, body 172 of flow straightener 170 may be in the shape of a circular disk, as illustrated in FIG. 4A, or may have any cross-sectional shape such as, for example, an oval, square, rectangle, triangle, polygon, irregular shape or the like. Apertures 174 may have a circular, oval, square, rectangular, slotted, triangular, polygonal, irregular or other shape. In various embodiments, flow straightener 170 may have a honeycomb structure 178, as illustrated in FIG. 4A. Flow straightener 170 including a honeycomb structure 178 may be configured to reduce turbulence of air entering air channel 134.

With reference to FIG. 4B, a cross-sectional view of a static airfoil assembly 180 an outlet 158 of aspirator barrel 132 taken along line 4B-4B of FIG. 3 is shown, in accordance with various embodiments. Static airfoil assembly 180 may comprise a plurality of stationary flow structures, which may be static airfoils 182. Static airfoils 182 may operate as a guide structure for air flowing through static airfoil assembly 180.

Figure 5:
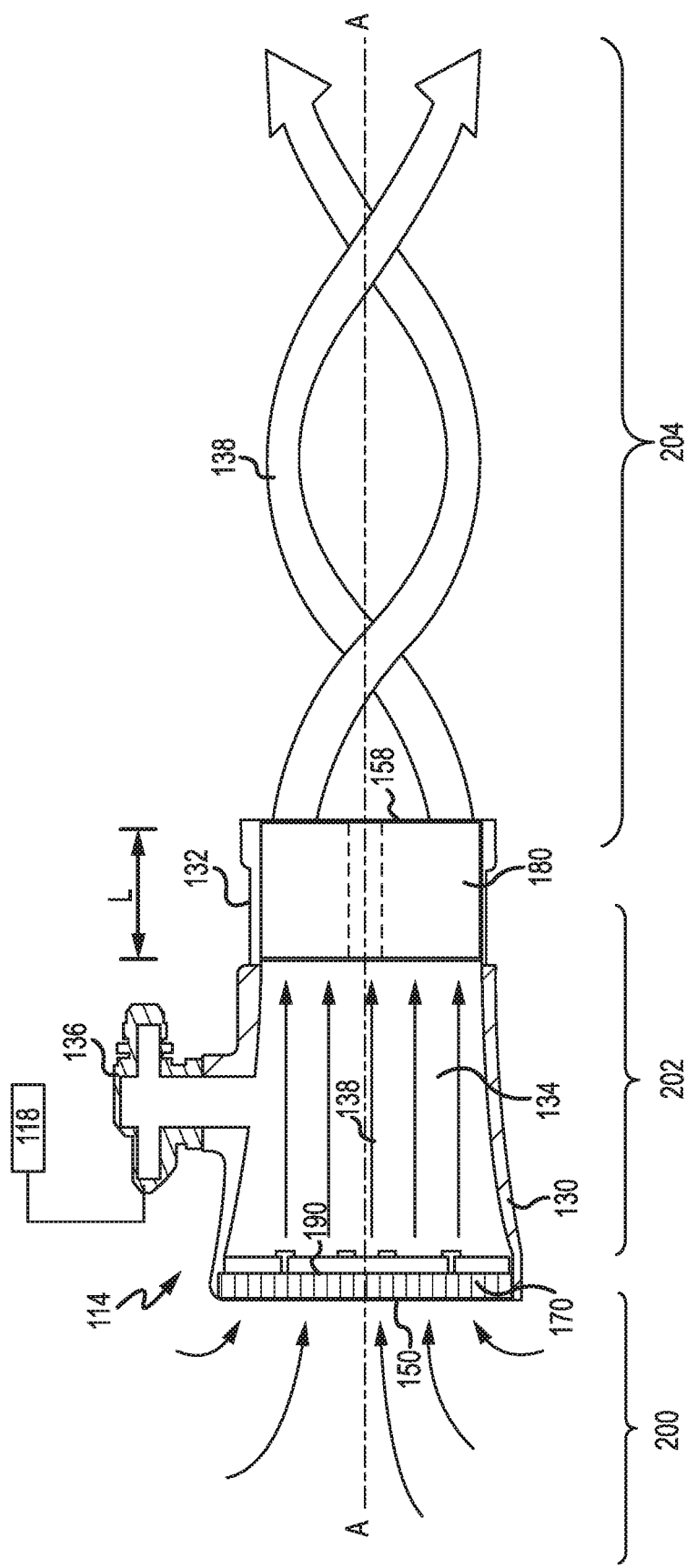
FIG. 5 illustrates a cross-sectional view of an aspirator for an inflatable evacuation device, in accordance with various embodiments.

Static airfoil assembly 180 may comprise a body 184 having a plurality of static airfoils 182 spaced apart by gaps 186, through which air may flow. Static airfoils 182 may extend radially inward from an outer circumference of the body 184 of static airfoil assembly 180, such that static airfoils 182 form a spoke configuration. Static airfoils 182 have a curved or arcuate cross-sectional shape and may be stationary with respect to body 184 of static airfoil assembly 180 and with respect to aspirator barrel 132 (FIG. 3). Static airfoils 182 may be arranged in a circular spoke pattern and may join at or near a center 187 of static airfoil assembly 180. Static airfoil assembly 180 may further comprise an opening 188 at center 187. Static airfoils 182 may direct air flowing through static airfoil assembly 180 in a direction rotating around the center 187 of static airfoil assembly 180, which may be aligned with longitudinal axis A-A' of aspirator 114. Airflow may exit static airfoil assembly 180 and travel in a swirling or vortex motion having a spiral flow path, i.e, vortex flow 204 (FIG. 5). The airflow path 138 exiting aspirator barrel 132 may be directed by static airfoils 182 in an axial spiral motion, which may be centered around the longitudinal axis A-A of the aspirator 114. The airflow path 138 travels axially along longitudinal axis A-A of aspirator body 130 and aspirator barrel 132 and reaches the static airfoils 182. In response to the axially-traveling airflow path 138 contacting the static airfoils 182, the airflow changes direction, imparting an angular velocity on the axially flow. This may produce a flow path which both rotates and travels axially, thus having a spiral or helical path, which is referred to herein as a vortex flow 204.

With reference now to FIG. 5 and still to FIGS. 4A and 4B, a path of airflow through an aspirator 114 and exiting an aspirator 114 is shown, in accordance with various embodiments. As discussed above, aspirator 114 may define an air channel 134 having an inlet 150 and an outlet 158. In various embodiments, aspirator 114 may include a flow straightener 170 disposed at the inlet 150 and/or may include a static airfoil assembly 180 disposed at the outlet 158.

The environmental gas may be a turbulent airflow 200 prior to being aspirated into aspirator 114 through inlet 150. Turbulent airflow 200 may enter flow straightener 170 at various angles. Flow straightener 170 may direct the airflow in a direction parallel to a longitudinal axis A-A of aspirator 114. Thus, flow straightener 170 may aid in reducing distortions or turbulence of the airflow path 138. Flow straightener 170 may produce a laminar flow 202 of airflow path 138. The laminar flow 202 of airflow path 138 within aspirator body 130 increases the efficiency of aspirator 114. Stated differently, the fluid flow discharged from the downstream edge 190 of flow straightener 170 may be straightened (e.g., the flow may be directed in a substantially parallel path to longitudinal axis A-A of aspirator 114) to increase and/or improve the efficiency of the aspirator 114. The airflow path 138 having reduced turbulence after passing through flow straightener 170 reduces the pressure loss within air channel 134, i.e. the pressure loss between input 150 and output 158. Less turbulence in airflow path 138 results in a lower wall shear stress thereby reducing frictional loss, i.e. kinetic energy lost through friction between the airflow in airflow path 138 and the inner walls of aspirator body 130 and aspirator barrel 132. Further, by reducing frictional loss by reducing turbulence in airflow path 138, less energy may be used to force air through aspirator 114. For example, less compressed gas from compressed fluid source 118, or a lower pressure of compressed gas, may be used as the energy input for aspirator 114. Thus, the laminar flow 202 through aspirator body 130 and aspirator barrel 132 may be a more efficient flow than turbulent flow and may increase the efficiency of aspirator 114. With a more efficient airflow path 138 through aspirator 114, the aspirator barrel 132 may be made shorter in length L. A length L of aspirator barrel 132 may be less than a length of an aspirator barrel having a turbulent flow, without reducing overall efficiency of aspirator 114. A shorter aspirator barrel 132 may decrease the packing space occupied by aspirator 114, thereby saving weight and space within an evacuation system 106 (FIG. 2).

The airflow path 138 may be a laminar flow 202 though air channel 134 as it enters aspirator barrel 132. Airflow path 138 passes through aspirator body 130 and aspirator barrel 132 and exits the aspirator 114 through outlet 158.

In various embodiments, static airfoil assembly 180 may receive laminar flow 202 from air channel 134. As discussed above, static airfoil assembly 180 may be configured to produce a vortex flow 204. Laminar flow 202 enters static airfoil assembly 180, which conditions the airflow to direct the airflow path 138 from a laminar flow 202 into a vortex flow 204. By receiving a laminar flow 202, static airfoil assembly 180 may produce a steady spiral airflow. Airflow may exit static airfoil assembly 180 and travel in a swirling or vortex motion having a spiral or helical flow path, i.e, vortex flow 204. The vortex flow 204 exiting aspirator barrel 132 may be directed in an axial spiral motion, which may be centered around the longitudinal axis A-A of the aspirator 114.

The vortex flow 204 exiting aspirator barrel 132 may be a more efficient flow than turbulent or uncontrolled flow and may increase the efficiency of aspirator 114. With a more efficient airflow path 138 exiting aspirator 114, the aspirator barrel 132 may be made shorter in length L, without reducing overall efficiency of aspirator 114. Either or both of flow straightener 170 and static airfoil assembly 180 may be incorporated into aspirator 114 to increase the airflow efficiency of aspirator 114.

Figure 6:
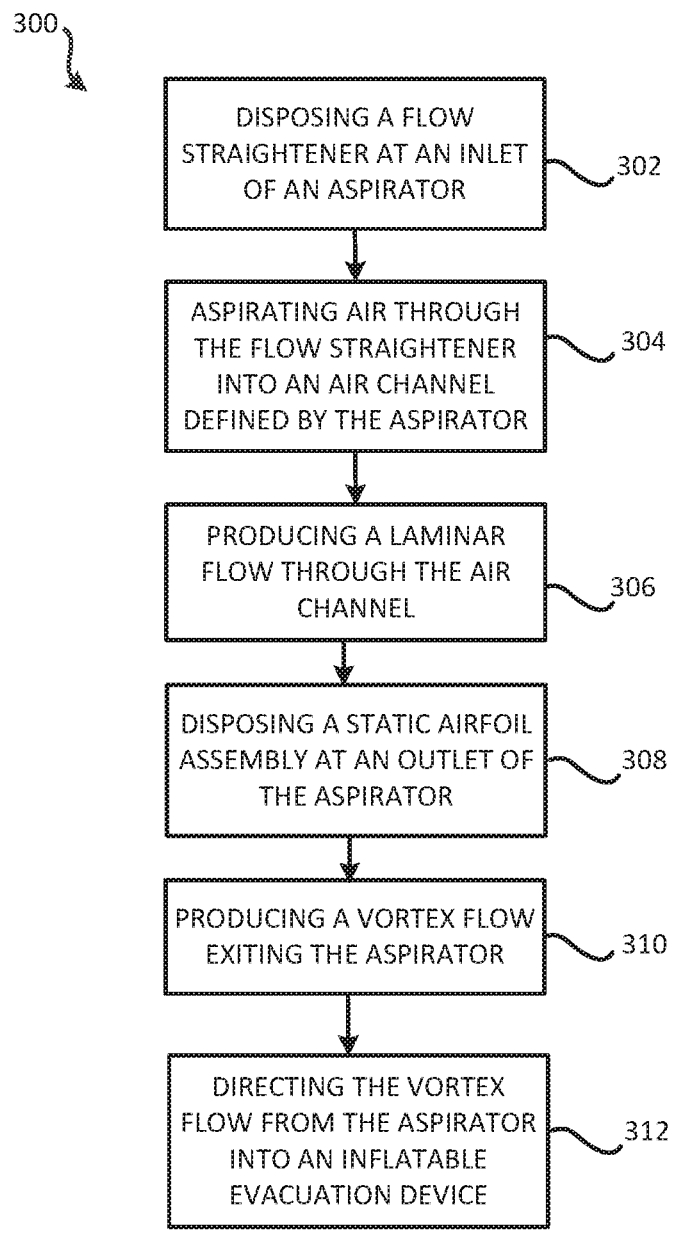
FIG. 6 illustrates a method for an aspirator, in accordance with various embodiments.

With reference to FIG. 6, a method 300 is shown, in accordance with various embodiments. Method 300 may comprise the steps of disposing a flow straightener at an inlet of an aspirator (step 302), aspirating air through the flow straightener into an air channel defined by the aspirator (step 304), and producing a laminar flow through the air channel (step 306). The flow straightener 170 may produce a laminar flow 202 through the air channel 134. The laminar flow 202 may increase the efficiency of aspirator 114. Method 300 may comprise the steps of disposing a static airfoil assembly at an outlet of the aspirator (308), and producing a vortex flow exiting the aspirator (step 310). The static airfoil assembly 180 may produce a vortex flow 204 exiting the aspirator 114. Method 300 may comprise the step directing the vortex flow from the aspirator into an inflatable evacuation device (step 312). The vortex flow 204 may increase the efficiency of aspirator 114.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator, comprising:
   an aspirator body defining an air channel and an inlet, wherein the aspirator body is configured such that environmental gas enters the aspirator through the inlet;
   a flow straightener disposed at the inlet, the flow straightener configured to produce a laminar flow through the air channel, wherein the flow straightener is configured to direct the environmental gas into the aspirator body in a direction parallel to a longitudinal axis of the aspirator;
   a gas valve in fluid communication with the air channel, wherein fluid traveling through the gas valve enters the air channel downstream of the inlet;
   an aspirator barrel coupled to the aspirator body and defining an outlet; and
   a static airfoil assembly disposed at the outlet, the static airfoil assembly configured to produce a vortex flow exiting the aspirator barrel.

2. The aspirator of claim 1, wherein the flow straightener comprises a body defining a plurality of apertures configured to direct the airflow.

3. The aspirator of claim 1, wherein the flow straightener includes a honeycomb structure configured to reduce turbulence of airflow entering the air channel.

4. The aspirator of claim 1, wherein the vortex flow exiting the aspirator barrel is directed in a spiral motion centered around the longitudinal axis of the aspirator.

5. The aspirator of claim 1, wherein the static airfoil assembly comprises a plurality of static airfoils arranged in a spoke configuration.

6. The aspirator of claim 5, wherein the plurality of static airfoils have an arcuate cross-sectional shape and are stationary with respect to the aspirator barrel.

7. An evacuation system for use with an aircraft, comprising:
   an inflatable evacuation device configured to be inflated by a compressed fluid source; and
   an aspirator coupled to the compressed fluid source and to the inflatable evacuation device, the aspirator comprising:

an aspirator body defining an air channel and an inlet, wherein the aspirator is configured such that environmental gas enters the air channel through the inlet, and a flow straightener disposed at the inlet, the flow straightener configured to produce a laminar flow through the air channel, wherein the flow straightener comprises a body defining a plurality of apertures configured to direct the environmental gas in a direction parallel to a longitudinal axis of the aspirator.

8. The evacuation system of claim 7, wherein the flow straightener includes a honeycomb structure configured to reduce turbulence of airflow entering the air channel.

9. The evacuation system of claim 7, further comprising an aspirator barrel coupled to the aspirator body and defining an outlet; and a static airfoil assembly disposed at the outlet, the static airfoil assembly configured to produce a vortex flow exiting the aspirator barrel.

10. The evacuation system of claim 9, wherein the static airfoil assembly comprises a plurality of static airfoils arranged in a spoke configuration.

11. The evacuation system of claim 9, wherein the aspirator comprises a longitudinal axis, and wherein the vortex flow exiting the aspirator barrel is directed in a spiral motion centered around the longitudinal axis of the aspirator.

12. The evacuation system of claim 7, wherein the aspirator is configured to pack with the inflatable evacuation device within the aircraft.

13. An aspirator method, comprising;

disposing a flow straightener at an inlet of an aspirator, the aspirator including a gas valve downstream of the inlet;

aspirating air through the flow straightener into an air channel defined by the aspirator, the flow straightener producing a laminar flow through the air channel; and disposing a static airfoil assembly at an outlet of the aspirator, the static airfoil assembly producing a vortex flow exiting the aspirator.

14. The aspirator method of claim 13, wherein the aspirator comprises a longitudinal axis, and wherein the flow straightener directs an airflow into the air channel in a direction parallel to the longitudinal axis of the aspirator.

15. The aspirator method of claim 13, wherein the flow straightener includes a honeycomb structure configured to reduce turbulence of airflow entering the air channel.

16. The aspirator method of claim 13, wherein the aspirator comprises a longitudinal axis, and wherein the vortex flow exiting the outlet is directed in a spiral motion centered around the longitudinal axis of the aspirator.

17. The aspirator method of claim 13, further comprising directing the vortex flow from the aspirator into an inflatable evacuation device.

* * * * *